(12) United States Patent
Nagase et al.

(10) Patent No.: US 10,839,588 B2
(45) Date of Patent: Nov. 17, 2020

(54) INFORMATION PROCESSING APPARATUS AND CIRCUIT PATTERN DISPLAY METHOD

(71) Applicant: FUJITSU LIMITED, Kawasaki (JP)

(72) Inventors: Kenji Nagase, Yokohama (JP);
Yoshiaki Hiratsuka, Ota (JP);
Tomoyuki Nakao, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/532,547

(22) Filed: Aug. 6, 2019

(65) Prior Publication Data

US 2020/0082593 A1 Mar. 12, 2020

(30) Foreign Application Priority Data

Sep. 10, 2018 (JP) .................................. 2018-169151

(51) Int. Cl.
| | |
|---|---|
| *G06T 15/00* | (2011.01) |
| *H05K 3/00* | (2006.01) |
| *G06T 11/00* | (2006.01) |
| *G06F 30/39* | (2020.01) |
| *G06F 115/12* | (2020.01) |
| *G06F 119/10* | (2020.01) |

(52) U.S. Cl.
CPC .............. *G06T 15/00* (2013.01); *G06F 30/39* (2020.01); *G06T 11/00* (2013.01); *H05K 3/00* (2013.01); *G06F 2115/12* (2020.01); *G06F 2119/10* (2020.01); *G06T 2200/08* (2013.01)

(58) Field of Classification Search
CPC ......... G06T 15/00; G06T 17/00; G06T 19/00; G06F 2115/12; G06F 2119/10; G06F 30/39
USPC .......................................... 716/110, 137, 115
See application file for complete search history.

(56) References Cited

U.S. PATENT DOCUMENTS

2013/0163996 A1\* 6/2013 Kagaya ............... H01P 1/20345
398/194

FOREIGN PATENT DOCUMENTS

| JP | 2000-155768 | 6/2000 |
|---|---|---|
| JP | 2010-283179 | 12/2010 |

\* cited by examiner

*Primary Examiner* — Paul Dinh
(74) *Attorney, Agent, or Firm* — Fujitsu Patent Center

(57) ABSTRACT

An information processing apparatus includes a memory, and a processor coupled to the memory and configured to receive a designation of a progression degree in which a circuit pattern displayed on a two-dimensional model of a printed circuit board is traced from a start point to an end point of the circuit pattern, display, on the two-dimensional model, the circuit pattern from the start point to a point corresponding to the progression degree on a three-dimensional model of the printed circuit board based on a setting of the start point and the end point of the circuit pattern, and display the circuit pattern of the two-dimensional model to distinguish a first pattern to form a part of the circuit pattern and a second pattern to form a part of the circuit pattern, the first pattern and the second pattern having portions overlapping each other.

12 Claims, 12 Drawing Sheets

| COMPONENT | | |
|---|---|---|
| COMPONENT ID | NUMBER OF PINS | COMPONENT TYPE |
| I1 | 24 | DCDC CONVERTER (STEP-DOWN) |
| I2 | 24 | DCDC CONVERTER (STEP-UP) |
| I3 | 24 | DCDC CONVERTER (STEP-DOWN/STEP-UP) |
| ⋮ | ⋮ | ⋮ |

```
PH
SS/TR
COMP
MODE
FB
EN
BST
VREG
Gate
VIN [VOLTAGE INPUT TERMINAL]
GND [ GND INPUT TERMINAL ]
```

INFORMATION PROCESSING APPARATUS AND CIRCUIT PATTERN DISPLAY METHOD

CROSS-REFERENCE TO RELATED APPLICATION

This application is based upon and claims the benefit of the prior Japanese Patent Application No. 2018-169151 filed on Sep. 10, 2018, the entire contents of which are incorporated herein by reference.

FIELD

The embodiments discussed herein are related to an information processing apparatus and a circuit pattern display method.

BACKGROUND

In a board design, measures are taken against the radiation noises generated in a switching power supply such as a DCDC converter. In the case of a DCDC converter, a mounting design to reduce the loop area that returns from a power supply pin on an input side of the DCDC converter to a GND of the DCDC converter via a capacitor is performed on a two-dimensional CAD (Computer-Aided Design) drawing. For example, when the loop is redundant, the drawing data of the two-dimensional CAD are edited to reduce the loop by, for example, changing a power supply pattern or GND pattern on the board or changing the layout of the components such as capacitors, and the layout of the vias on a noise path.

Related techniques are disclosed in, for example, Japanese Laid-open Patent Publication Nos. 2010-283179 and 2000-155768.

SUMMARY

According to an aspect of the embodiments, an information processing apparatus includes a memory, and a processor coupled to the memory and configured to receive a designation of a progression degree in which a circuit pattern displayed on a two-dimensional model of a printed circuit board is traced from a start point to an end point of the circuit pattern, display, on the two-dimensional model, the circuit pattern from the start point to a point corresponding to the progression degree on a three-dimensional model of the printed circuit board based on a setting of the start point and the end point of the circuit pattern, and display the circuit pattern of the two-dimensional model to distinguish a first pattern to form a part of the circuit pattern and a second pattern to form a part of the circuit pattern, the first pattern and the second pattern having portions overlapping each other.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When a path of a circuit pattern (a noise path) that is a primary factor of a noise generation is displayed in a two dimension, since the noise path is displayed in a state where a path on a power supply pattern of the noise path and a path on a GND pattern of the noise path overlap in a layer direction of a board, there is a limit to the visibility.

Embodiments of a technology capable of improving the visibility of a two-dimensional view of a power supply noise path will be described with reference to the accompanying drawings. The embodiments do not limit the disclosed technique. Also, the embodiments may be suitably combined with each other unless the processing contents thereof are contradictory.

First Embodiment

Figure 1:
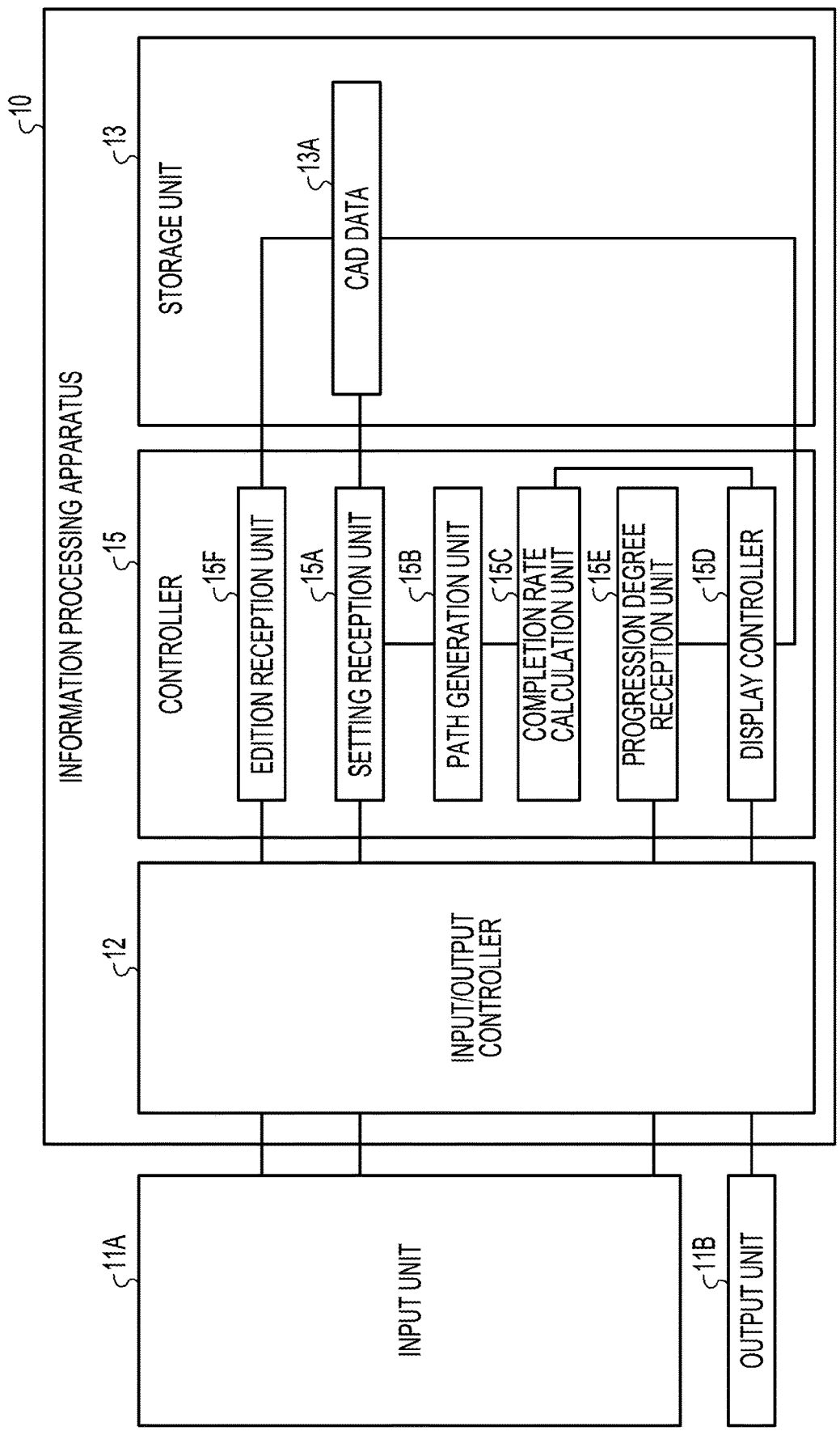
FIG. 1 is a block diagram illustrating an example of the functional configuration of an information processing apparatus according to a first embodiment.

FIG. 1 is a block diagram illustrating an example of the functional configuration of an information processing apparatus 10 according to a first embodiment. The information processing apparatus 10 illustrated in FIG. 1 corresponds to a calculator, a so-called computer, and may be any type of computer as long as the information processing apparatus 10 has an environment in which a computer program may operate.

For example, the computer program operating on the information processing apparatus 10 may be a CAD (Computer-Aided Design) program, which is one of design support tools. Hereinbelow, by way of an example of a use case, descriptions will be made on a case where the CAD program is used for an implementation design of various boards such as a printed circuit board.

As a part of a design support function, the CAD program has a power supply noise path display function that displays on a two-dimensional CAD drawing a path of a radiation noise generated by a switching power supply such as a DCDC converter, which is so-called a path of a power supply noise. The term "DC" used herein is an abbreviation of "Direct Current". Further, the notation of "DCDC converter" used herein may be a "DC-DC converter" or a "DC/DC converter".

The path display function may not necessarily be implemented as a component of the CAD program described above. For example, the path display function may be implemented as a module added to the CAD program, or may be implemented as a library referred to by the CAD program.

Although an example of displaying a power supply noise path in the DCDC converter is given below merely as an example of a switching power supply, this example does not exclude displaying noise paths of other switching power supplies.

[One Aspect of Technical Significance of Power Supply Noise Path Display Function]

Here, one aspect of the technical significance of displaying the above-mentioned power supply noise path by a two-dimensional CAD will be described. As one aspect, when a board implementation design is performed, the operability of editing components and layouts arranged on a board on the two-dimensional CAD drawing is superior over the operability of editing components and layouts arranged on a board on a three-dimensional CAD model. One of the reasons is that when editing the dimensions and layouts of the three-dimensional CAD model, the operation becomes complicated by the addition of an operation in the depth direction of viewpoint, whereas the operation of editing the two-dimensional CAD drawing is relatively easier because there is no operation in the depth direction.

Figure 2:
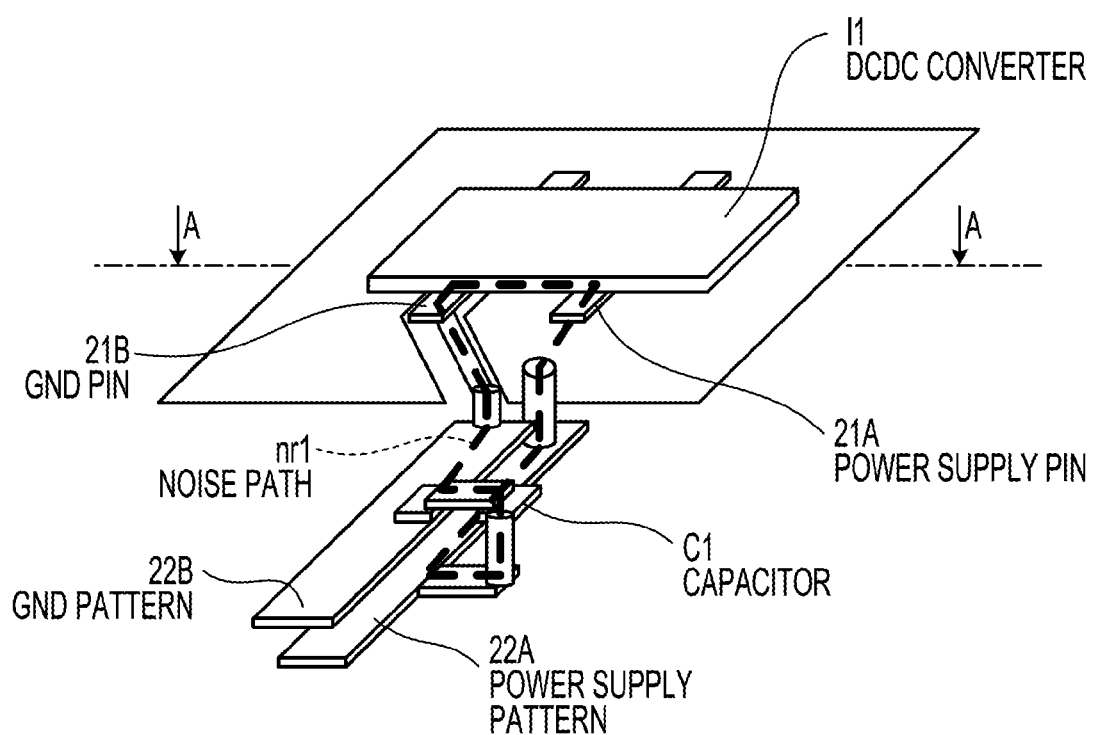
FIG. 2 is a perspective view illustrating an example of a three-dimensional CAD model.

FIG. 2 is a perspective view illustrating an example of a three-dimensional CAD model. FIG. 2 illustrates a model of a component related to a power supply noise generated by a switching operation of a DC-DC converter I1, among components included in the assembly of a board. For example, as a current is generated in a loop from a power supply pin 21A to a GND pin 21B via a power supply pattern 22A, a capacitor C1 and a GND pattern 22B, a power supply noise propagates along a path nr1 as illustrated in FIG. 2. In this manner, when the power supply noise path nr1 is displayed on the three-dimensional CAD model, the visibility is high while the operability is low. For example, even when it is intended to change the dimensions of the power supply pattern 22A or the GND pattern 22B, or change the layout of components present on the power supply noise path nr1, such as the capacitor C1 or a via (not illustrated), since the changing involves a modeling change, the operation becomes complicated. Further, the term "GND" used herein is an abbreviation of "Ground".

As described above, the above-described power supply noise path display function has a technical significance from the aspect of implementing the editing operation to reduce the area of the power supply noise loop in the same manner as a manual drawing.

[One Aspect of Problem]

However, as described in the "BACKGROUND" section, when displaying the power supply noise path by the two-dimensional CAD, since the path on the power supply pattern of the noise path and the path on the GND pattern of the noise path overlap in the layer direction of the board, the visibility thereof is limited.

Figure 3:
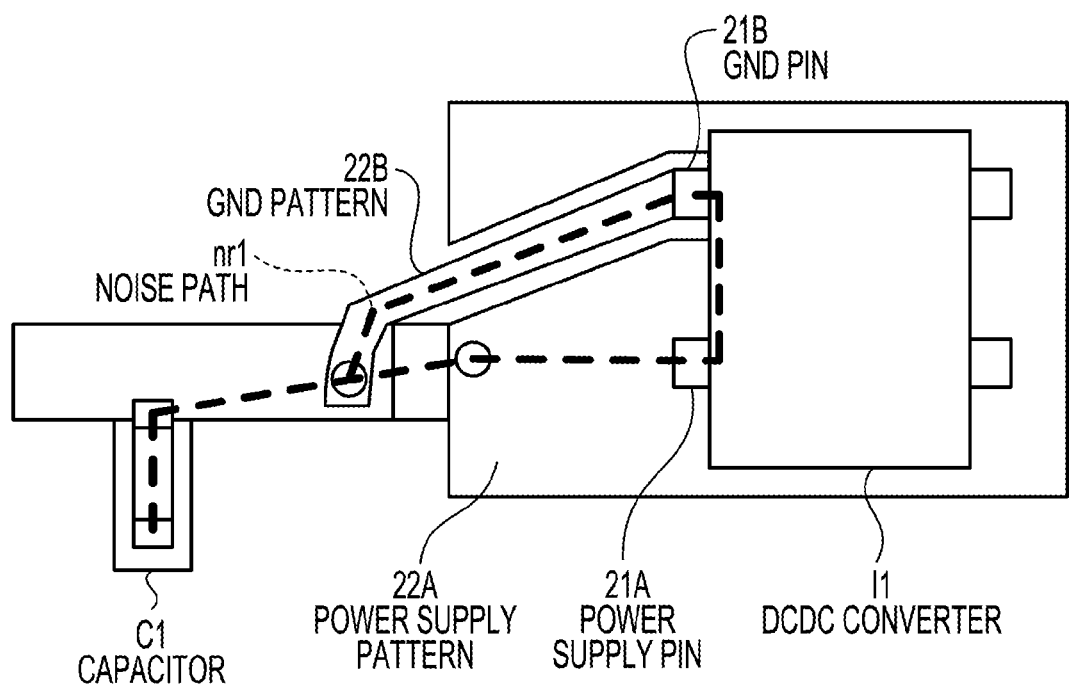
FIG. 3 is a view illustrating an example of a two-dimensional CAD drawing.

FIG. 3 is a view illustrating an example of a two-dimensional CAD drawing. FIG. 3 is a plan view of the assembly of the board illustrated in FIG. 2 as viewed in the direction of arrows A-A, that is, from above. As illustrated in FIG. 3, when the power supply noise path nr1 is displayed on the plan view of the two-dimensional CAD, surface patterns such as the power supply pattern 22A and the GND pattern 22B overlap in the layer direction of the board, that is, in the vertical direction. As a result, the path on the GND side in the power supply noise path nr1 becomes invisible.

In this manner, in a situation where the entire power supply noise path nr1 may not be grasped, it is difficult to determine whether the dimensions of the power supply pattern 22A and the GND pattern 22B are appropriate and further, it is difficult to determine whether the layouts of components present on the power supply noise path nr1, such as the capacitor C1 and vias (not illustrated), are appropriate. Therefore, it may not be determined what kind of operation needs to be performed in order to reduce the area of the power supply noise loop.

[One Aspect of Approach to Problem Solving]

Therefore, when displaying a power supply noise path on the two-dimensional CAD drawing, the information processing apparatus 10 according to the present embodiment receives a designation of the degree of progression of the power supply noise from the start point to the end point of the path, and displays a path from the start point to a ratio corresponding to the designated progression degree on the two-dimensional CAD drawing.

Figure 4:
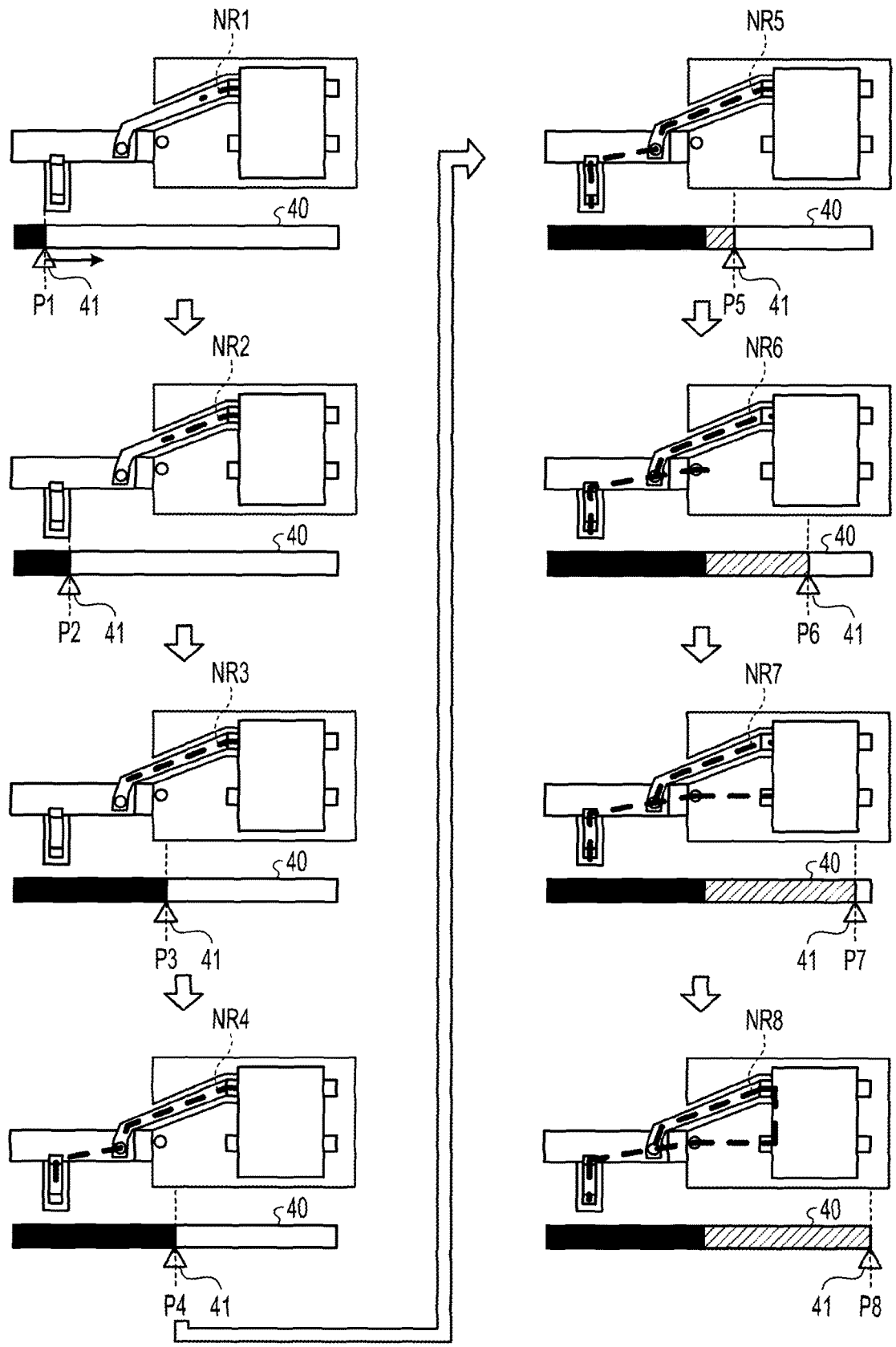
FIG. 4 is a view illustrating an example of a screen transition of a two-dimensional view of a power supply noise path.

FIG. 4 is a view illustrating an example of a screen transition of a two-dimensional view of a power supply noise path. FIG. 4 illustrates the screen transition when a slider 41 on a slider bar 40 is moved in an order of position P1 to position P8. As illustrated in FIG. 4, in the present embodiment, the two-dimensional CAD drawing itself is not different from the two-dimensional CAD drawing in the prior art illustrated in FIG. 3. Meanwhile, in FIG. 4, reference numerals of the DCDC converter I1, the power supply pin 21A, the power supply pattern 22A, the capacitor C1, the GND pattern 22B, and the GND pin 21B are omitted from the aspect of emphasis on display of the power supply noise path.

In the meantime, in the present embodiment, as illustrated in FIG. 4, the entire power supply noise path is not necessarily displayed on the two-dimensional CAD drawing. That is, the present embodiment has the difficulty of creation in that the ratio of paths to be displayed on the two-dimensional CAD drawing is changed according to the progression degree of the power supply noise path that is designated by the position P1 to the position P8 of the slider 41 on the slider bar 40.

For example, in the example illustrated in FIG. 4, a GUI (Graphical User Interface) operation is performed to bring the slider 41 on the slider bar 40 closer to the end on the slider bar 40 in the order of positions P1 to P8. The designation of the position P1 to the position P8 of the slider 41 may be received by a drag operation of the slider 41, or a command to increase the degree of progression monotonically, for example, pressing of a play button of a moving image for moving the position of the slider 41 closer from the beginning to the end of the slider bar 40 with the lapse of time, may be received through the GUI. By this GUI operation, the display of the power supply noise path on the two-dimensional CAD drawing is also changed from a path NR1 to a path NR8.

By displaying the paths NR1 to NR8 of the power supply noise corresponding to the eight progression degrees of the positions P1 to P8 of the slider 41, even when a path on the power supply pattern and a path on the GND pattern of the noise path overlap in the layer direction of the board, it is possible to grasp the path on the GND pattern.

This is because, even when the progression degree of the power supply noise path is changed by changing the position of the slider 41 on the slider bar 40, when there is no change in the display of the power supply noise path on the two-dimensional CAD drawing, it is possible to grasp that the path on the power supply pattern and the path on the GND pattern of the noise path overlap in the layer direction of the board.

In the example illustrated in FIG. 4, even when the slider 41 on the slider bar 40 is changed from the position P4 to the position P5, there is no change in display between the path NR4 and the path NR5 of the power supply noise on the two-dimensional CAD drawing. In this manner, from the display illustrating that the power supply noise path is not changed at a stage where the path on the power supply pattern reaches the capacitor C1, the power supply noise may be returned to the path on the GND pattern in the capacitor C1 and it is possible to grasp that the path on the GND pattern and the path on the power supply pattern overlap in the layer direction of the board.

Here, the state change in which the power supply noise is returned from the path on the power supply pattern to the path on the GND pattern may also be notified by the display of the slider bar 40. That is, in addition to distinguishing the display form between a section from the beginning of the slider bar 40 to the position of the slider 41 and a section from the position of the slider 41 to the end of the slider bar 40, the display form is further distinguished between a section before the power supply noise passes through the capacitor C1 and a section after the power supply noise passes through the capacitor C1.

For example, in the example of FIG. 4, at the stage when the slider 41 is moved to the position P5 on the slider bar 40, the section before the power supply noise passes through the capacitor C1 is displayed in black, while the section after the power supply noise passes through the capacitor C1 is displayed by hatching. Such a display form makes it possible to notify that the power supply noise is returned from the path on the power supply pattern to the path on the GND pattern at the boundary between the black section and the hatching section. Although FIG. 4 illustrates an example in which returning of the power supply noise from the path on the power supply pattern to the path on the GND pattern is implemented by the display on the slider bar 40, the display form of the power supply noise path, for example, the line type and color, may also be implemented by changing the capacitor C1 to the boundary.

Furthermore, as the slider 41 on the slider bar 40 is changed from the position P5 to the position P6, the display of the power supply noise path on the two-dimensional CAD drawing is changed from the path NR5 to the path NR6, which makes it possible to grasp that the path on the GND pattern overlaps the path on the power supply pattern in the layer direction of the board in a section from when a change disappears in the display of the power supply noise path on the two-dimensional CAD drawing to when the change is resumed.

From the above, in the information processing apparatus 10 according to the present embodiment, it may be determined whether the dimensions of the power supply pattern 21A and the GND pattern 21B are appropriate, and further, whether the layouts of components present on the path nr1 of the power supply noise, such as the capacitor C1 and vias (not illustrated), are appropriate. Therefore, the visibility of the two-dimensional view of the power supply noise path may be improved with the information processing apparatus 10 according to the present embodiment.

[Peripheral Device of Information Processing Apparatus 10]

As illustrated in FIG. 1, functional units such as an input unit 11A and an output unit 11B are connected to the information processing apparatus 10 via an input/output controller 12. The connection form between the information processing apparatus 10 and the input unit 11A/the output unit 11B may be either wired or wireless. For example, the connection form may be a LAN (Local Area Network) connection via an adapter or a cable, or may be a serial connection via a USB (Universal Serial Bus) or another serial interface.

The input unit 11A is a functional unit that receives various instruction inputs.

For example, when a desktop or laptop computer is used as the information processing apparatus 10, a general-purpose peripheral device such as a keyboard or a mouse corresponds to the input unit 11A, and a joystick or the like operating in the vertical and horizontal directions is also included in the category of the input unit 11A.

The output unit 11B is a functional unit that outputs various types of information.

For example, a liquid crystal display or an organic EL (electroluminescence) display that implements display by light emission corresponds to the output unit 11B. In addition to such a device that implements display by light emission, a projector or the like that implements display by projection also corresponds to the output unit 11B. Further, an audio output unit such as a speaker also corresponds to the output unit 11B.

[Functional Configuration of Information Processing Apparatus 10]

Next, the functional configuration of the information processing apparatus 10 according to the present embodiment will be described. As illustrated in FIG. 1, the information processing apparatus 10 includes an input/output controller 12, a storage unit 13, and a controller 15. Here, FIG. 1 illustrates a solid line representing a relationship of data transmission and reception, but for the sake of convenience of explanation, the solid line is illustrated for only a minimum part. That is, input/output of data related to each processing unit is not limited to the illustrated example, but input/output of data other than illustrated, for example, between a processing unit and another processing unit, between a processing unit and data, and between a processing unit and an external device, may be possible.

The input/output controller 12 corresponds to a functional unit that controls input/output of information with functional units corresponding to peripheral devices such as the input unit 11A and the output unit 11B.

As one aspect, the input/output controller 12 outputs various instruction inputs from the input unit 11A, for example, operation information for the CAD system, to the controller 15, and outputs an image output from the controller 15, for example, screen data corresponding to a two-dimensional CAD drawing, a three-dimensional CAD model, etc., to the output unit 11B.

The storage unit 13 corresponds to a functional unit that stores data used for various application programs, for example, various programs such as the above-mentioned CAD program, including an OS (Operating System) executed by the controller 15.

In an embodiment, the storage unit 13 may be implemented as an auxiliary storage device in the information processing apparatus 10. For example, a hard disk drive (HDD), an optical disk, a solid state drive (SSD), or the like may be adopted as the storage unit 13. The storage unit 13 may not necessarily be implemented as an auxiliary storage device, and may be implemented as a main storage device in the information processing apparatus 10. In this case, various storage devices such as a random access memory (RAM) and a flash memory may be adopted as the storage unit 13.

The storage unit 13 stores CAD data 13A and the like as an example of data used for a program executed by the controller 15. In addition to such CAD data 13A, the storage unit 13 may be configured to store various display settings related to the power supply noise path display function, for example, other data such as the line type, color, and thickness of the path. The description of the CAD data 13A will be made in conjunction with the description of the controller 15 that obtains or refers to the CAD data 13A.

The controller 15 is a functional unit that controls the entire information processing apparatus 10.

In an embodiment, the controller 15 may be implemented by a hardware processor such as a CPU (Central Processing Unit) or an MPU (Micro Processing Unit). Here, the CPU and the MPU are illustrated as examples of a processor, but the controller 15 may be implemented by any processor, for example, a GPU (Graphics Processing Unit), a DSP (Digital Signal Processor), a DLU (Deep Learning Unit), or a GPGPU (General-Purpose computing on Graphics Processing Units), regardless of a general-purpose type or a specialized type. In addition to this, the controller 15 may be implemented by a hard-wired logic such as an ASIC (Application Specific Integrated Circuit) or an FPGA (Field Programmable Gate Array).

The controller 15 virtually implements the following processing unit by deploying the above-mentioned CAD program on a work area of a RAM mounted as a main storage device (not illustrated). Here, although a case where the CAD program in which the entire design support function described above is packaged is executed is given as an example only, the program module may be executed in units of the power supply noise path display function or the like.

As illustrated in FIG. 1, the controller 15 includes a setting reception unit 15A, a path generation unit 15B, a completion rate calculation unit 15C, a display controller 15D, a progression degree reception unit 15E, and an edition reception unit 15F.

The setting reception unit 15A is a processing unit that receives the setting of the start point and the end point of a power supply noise path.

As an embodiment, when the CAD system is being activated by executing the CAD program on the information processing apparatus 10, the setting reception unit 15A receives a noise path display request via the input unit 11A or the like. Upon receiving the noise path display request, the setting reception unit 15A receives the setting of the start point and the end point of the power supply noise path. As an example only, the setting reception unit 15A may receive the setting of the start point and the end point of the power supply noise path through the following GUI operation.

For example, certain DCDC converters also have the functions of a step-down converter, a step-up converter, or a step-down/step-up (inverted) converter. In such a case, the setting reception unit 15A may designate which type of the step-down converter, the step-up converter, and the step-up/step-down converter the DCDC converter functions. In this manner, the designation of the function type of the DCDC converter may be implemented by setting the following property information in the CAD data 13A stored in the storage unit 13. For example, "DCDC converter (step-down)" corresponding to the step-down converter, "DCDC converter (step-up)" corresponding to the step-up converter, and "DCDC converter (step-down/step-up)" corresponding to the step-down/step-up converter are set in property information of components (IC: Integrated Circuit) included in the top assembly of a three-dimensional CAD board. Accordingly, when the noise path display request is received, the function type of the DCDC converter may be designated from among "DCDC converter (step-down)", "DCDC converter (step-up)", and "DCDC converter (step-down/step-up)".

Furthermore, the setting reception unit 15A may designate a start pin corresponding to the start point of the power supply noise path and an end pin corresponding to the end point of the power supply noise path among pins included in the DCDC converter. Such a designation of the start pin and the end pin may be implemented by setting the following property information in the CAD data 13A stored in the storage unit 13. For example, a "VIN" corresponding to a voltage input terminal and a "GND" corresponding to a GND input terminal are set in the property information of the DCDC converter subassembly included in the top assembly of the three-dimensional CAD board. Thus, the designation of the start pin and the end pin may be received at a stage where the type of function of the DCDC converter is designated.

Figure 5:
FIG. 5 is a view illustrating an example of a GUI operation.

FIG. 5 is a view illustrating an example of the GUI operation. For example, upon receiving the noise path display request, the setting reception unit 15A may be configured to display a list regarding the function type of the DCDC converter illustrated in the upper part of FIG. 5. The list illustrated in the upper part of FIG. 5 includes three converters, that is, a DCDC converter (step-down) identified by component number "I1", a DCDC converter (step-up) identified by component number "I2", and a DCDC converter (step-down/step-up) identified by component number "I3". By receiving any of the three options, it is possible to designate the function type of the DCDC converter. In the example illustrated in the upper part of FIG. 5, a case where the DCDC converter (step-down) highlighted in the list in the upper part of FIG. 5 is selected is illustrated as an example only. In this manner, after the function type of the DCDC converter is designated, the setting reception unit 15A may be configured to display the pins of the DCDC converter as options, as illustrated in the lower part of FIG. 5. This allows the start pin and the end pin to be designated by receiving a selection among 12 types of pins including the VIN and the GND.

Here, the power supply noise has an input side path and an output side path. The type of pin designated as the start pin and the end pin is also changed according to which of these paths is viewed. For example, in the case of the input side path, the VIN [voltage input terminal] set in the property information of the DCDC converter may be set as the start pin, and the GND [GND input terminal] set in the property information of the DCDC converter may be set as the end pin. In the case of the output side path, a pin connected to a power supply net other than the VIN [voltage input terminal] set in the property information of the DCDC converter may be set as the start pin, and the VIN [voltage input terminal] set in the property information of the DCDC converter may be set as the end pin.

The path generation unit 15B is a processing unit that generates a power supply noise path.

In an embodiment, the path generation unit 15B refers to the CAD data 13A stored in the storage unit 13 to generate a topology of connecting the start pin to the end pin whose setting has been received by the setting reception unit 15A.

A method of generating the topology differs according to whether to generate the input side path or the output side path.

(1) Input Side Path

As one aspect, when creating a power supply noise path on the input side, the path generation unit 15B generates a topology that satisfies the following constraint condition. For example, the path generation unit 15B generates a topology that satisfies the constraint condition of connecting from the start pin to the end pin via the EMC (Electromagnetic Compatibility) or the power supply capacitor C1 on the assembly of a three-dimensional CAD board. Here, since the above-mentioned constraint condition is not a condition that is narrowed down by a selection, the number of topologies satisfying the constraint condition is not necessarily one. Thus, a plurality of topologies satisfying the constraint conditions is generated. In this manner, when a plurality of topologies is generated, the path generation unit 15B narrows down the number of topologies to one by extracting a topology that satisfies the following two narrowing-down conditions. For example, as a first narrowing-down condition, priority is given to a topology which has a small number of vias. As a second narrowing-down condition, priority is given to a topology in which a distance from the start pin to the end pin is relatively short. By using the two narrowing-down conditions, the path generation unit 15B extracts one topology from the plurality of topologies. The topology thus extracted is output as a power supply noise path on the input side.

(2) Output Side Path

As for another aspect, when creating a power supply noise path on the output side, the method of generating a topology differs according to whether the path is via a snubber circuit or a diode, or via an output coil L.

(2.1) Via Snubber/D

For example, in the case of creating a path via a snubber circuit or a diode among power supply noise paths on the output side, a topology that satisfies the following constraint condition is generated. For example, the path generation unit 15B generates a topology that satisfies the constraint condition of transmitting and connecting from the start pin on the assembly of the three-dimensional CAD board through the GND pin of the DCDC converter via a resistor R and a capacitor C2 of the snubber circuit, and connecting up to the end pin via the capacitor C1. Here, passing via the resistor R is included in the above-described constraint condition, but the resistance R may not necessarily be included in the constraint condition. Also, in this case, since the constraint condition is not a condition of narrowing down alternatively, the number of topologies that satisfies the constraint condition is not necessarily one. Thus, a plurality of topologies that satisfies the constraint conditions is generated. In this manner, when a plurality of topologies is generated, the path generation unit 15B narrows down the number of topologies to one by extracting a topology that satisfies the following two narrowing-down conditions. For example, as a first narrowing-down condition, priority is given to a topology which has a small number of vias. As a second narrowing-down condition, priority is given to a topology in which a distance from the start pin to the end pin is short. By using the two narrowing-down conditions, the path generation unit 15B extracts one topology from the plurality of topologies. The topology thus extracted is output as a power supply noise path (snubber path) on the output side.

(2.2) Via Output Coil

In the case of creating a path via an output coil among power supply noise paths on the output side, a topology that satisfies the following constraint condition is generated. For example, the path generation unit 15B generates a topology that satisfies the constraint condition of transmitting and connecting from the start pin on the assembly of the three-dimensional CAD board through the GND pin of the DCDC converter via an output coil L and the EMC or a power supply capacitor C3, and connecting up to the end pin via the capacitor C1. Here, since the constraint condition is not a condition of narrowing down alternatively, the number of topologies that satisfies the constraint condition is not necessarily one (1). Thus, a plurality of topologies that satisfies the constraint conditions is generated. In this manner, when a plurality of topologies is generated, the path generation unit 15B narrows down the number of topologies to one by extracting a topology that satisfies the following two narrowing-down conditions. For example, as a first narrowing-down condition, priority is given to a topology which has a small number of vias. As a second narrowing-down condition, priority is given to a topology in which a distance from the start pin to the end pin is relatively short. By using the two narrowing-down conditions, the path generation unit 15B extracts one topology from the plurality of topologies. The topology thus extracted is output as a power supply noise path (via an output coil) on the output side.

The completion rate calculation unit 15C is a processing unit that calculates the ratio of the current loop length with respect to the shortest loop length as a completion rate. The phrase "shortest loop" used herein refers to the path length of a loop that is assumed to be the shortest by excluding factors other than the size of a component that passes between the start pin and the end pin. Meanwhile, the phrase "current loop length" used herein refers to the path length of a power supply noise path generated by the path generation unit 15B. Surely, the power supply noise path includes not only the size of the component passing between the start pin and the end pin but also a factor such as a distance between components.

Figure 6:
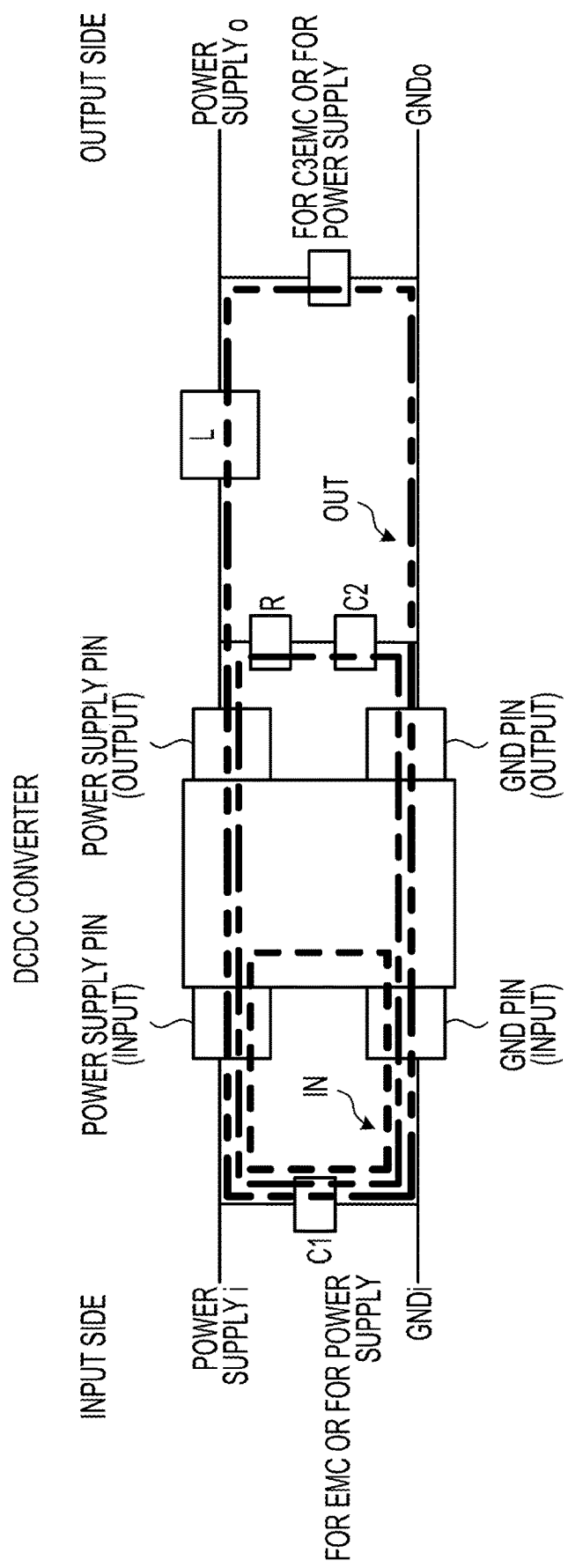
FIG. 6 is a view illustrating an example of a step-down circuit.

FIG. 6 is a view illustrating an example of a step-down circuit. FIG. 6 schematically illustrates a step-down circuit when the DCDC converter I1 functions as a DCDC converter (step-down). Further, in FIG. 6, the shortest loop corresponding to the input side path, the shortest loop corresponding to the output side path (via the snubber/D), and the shortest loop corresponding to the output side path (via the output coil) are schematically indicated by a bold solid line, a bold one-dot chain line, and a bold two-dot chain line, respectively.

As one aspect, when calculating the shortest loop length L1 corresponding to the input side path, the completion rate calculation unit 15C calculates the shortest loop length L1 based on the capacitor C1 and the inter-PIN distance of the DCDC converter I1 illustrated in FIG. 6. For example, the shortest loop length L1 is calculated according to the following equation (1). As another aspect, when calculating the shortest loop length L2 corresponding to the output side path (via the snubber/D), the completion rate calculation unit 15C calculates the shortest loop length L2 based on the above-described shortest loop length L1, the capacitor C2, and the inter-PIN distance of the DCDC converter I1 illustrated in FIG. 6. For example, the shortest loop length L2 is calculated according to the following equation (2). As a further aspect, when calculating the shortest loop length L3 corresponding to the output side path (via the output coil), the completion rate calculation unit 15C calculates the shortest loop length L3 based on the above-described shortest loop length L2, and the output coil L and the capacitor C3 illustrated in FIG. 6. For example, the shortest loop length L3 is calculated according to the following equation (3). The completion rate may be calculated by dividing the path length of the power supply noise path generated by the path generation unit 15B, that is, the current loop length, by the shortest loop length L1, L2, or L3 calculated in this manner. As an example, the peripheral length of a component set in the property information of the component is used for the size of each component in the following equations (1) to (3).

$$L1 = \text{Capacitor } C1 + \text{Inter-PIN distance of DCDC converter} \quad (1)$$

$$L2 = L1 + \text{Resistor } R + \text{Capacitor } C2 + \text{Inter-PIN distance of DCDC converter} \quad (2)$$

$$L3 = L2 + \text{Output coil } L + \text{Capacitor } C3 \quad (3)$$

The display controller 15D is a processing unit that executes a display control on the output unit 11B.

As one aspect, upon receiving the noise path display request, the display controller 15D transitions the window display to the display of two-dimensional CAD drawing even when either the assembly of the three-dimensional CAD board or the two-dimensional CAD drawing has been displayed by the output unit 11B by that time. At this time, the display controller 15D distinguishes and displays a component related to the power supply noise among the components included in the two-dimensional CAD drawing from the other components. For example, the display controller 15D may highlight the silhouette of components such as the DCDC converter I1, the capacitors C1 to C3, the resistor R, and the output coil L. Further, the display controller 15D displays the power supply noise path generated by the path generation unit 15B on the two-dimensional CAD drawing. Here, at the initial stage when the noise path display request is received, the entire power supply noise path may be displayed on the two-dimensional CAD drawing, for example, with the progression degree of 100%.

Figure 7:
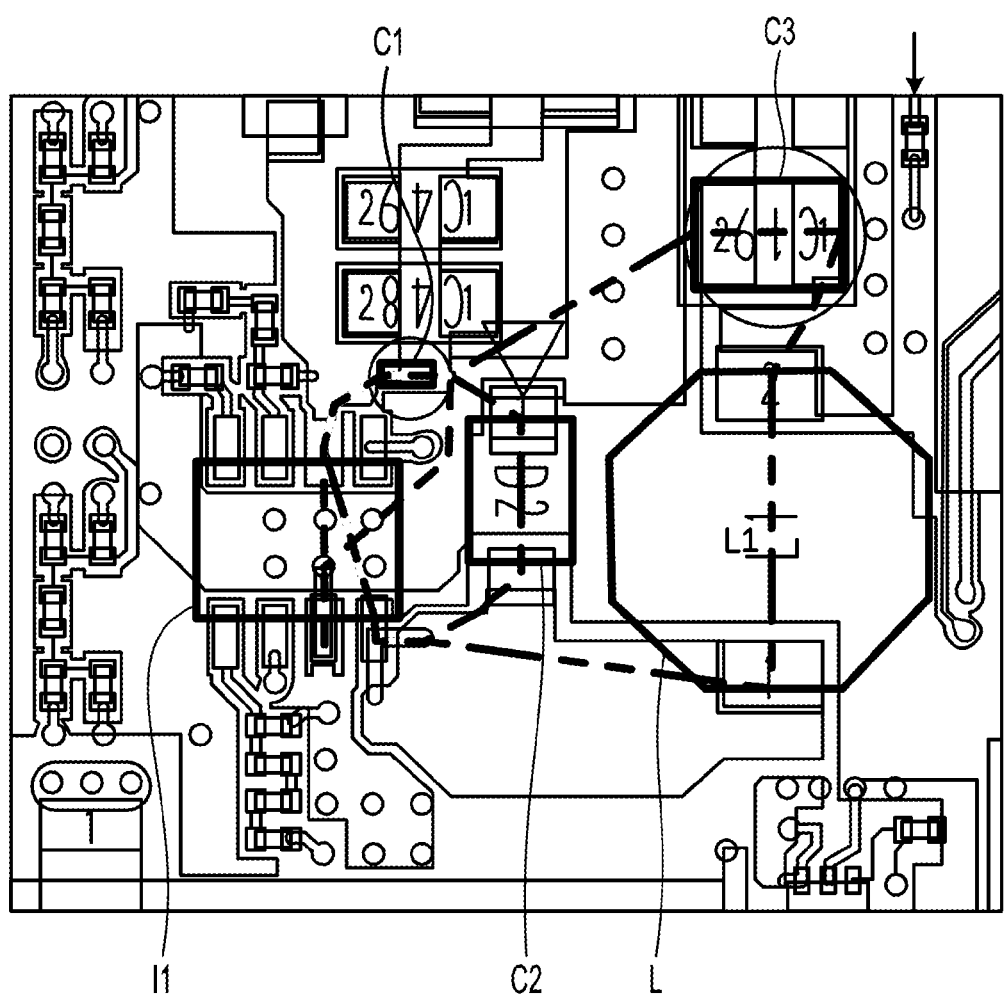
FIG. 7 is a view illustrating an example of a two-dimensional CAD drawing.

FIG. 7 is a view illustrating an example of a two-dimensional CAD drawing. FIG. 7 is a plan view of the assembly of a board from the above. Further, FIG. 7 illustrates an example where the initial setting of the progression degree is set to 100% and the entire power supply noise path is displayed. As illustrated in FIG. 7, among the components included in the two-dimensional CAD drawing, the silhouette of components such as the DCDC converter I1, the capacitors C1 to C3, and the output coil L corresponding to the components related to the power supply noise is highlighted. Further, on the two-dimensional CAD drawing, the power supply noise path on the input side is indicated by a bold solid line, the power supply noise path (via snubber/D) on the output side is indicated by a bold one-dot chain line, and the power supply noise path (via the output coil) on the output side is indicated by a bold two-dot chain line.

Furthermore, the display controller 15D may further display a display control panel that controls the display of the power supply noise path on the two-dimensional CAD drawing. For example, the display control panel may be configured to include GUI components such as a slider bar and a slider that designate the progression degree of power supply noise path progressing from the start point to the end point, as well as a GUI component such as a command of increasing the degree of progression monotonically, for example, a play button of a moving image that moves the position of the slider 41 from the beginning to the end of the slider bar 40 with the lapse of time. In addition to this, the display control panel may also be configured to include a GUI component that sets the display form such as the type and color of a line of displaying the power supply noise path.

Figure 8:
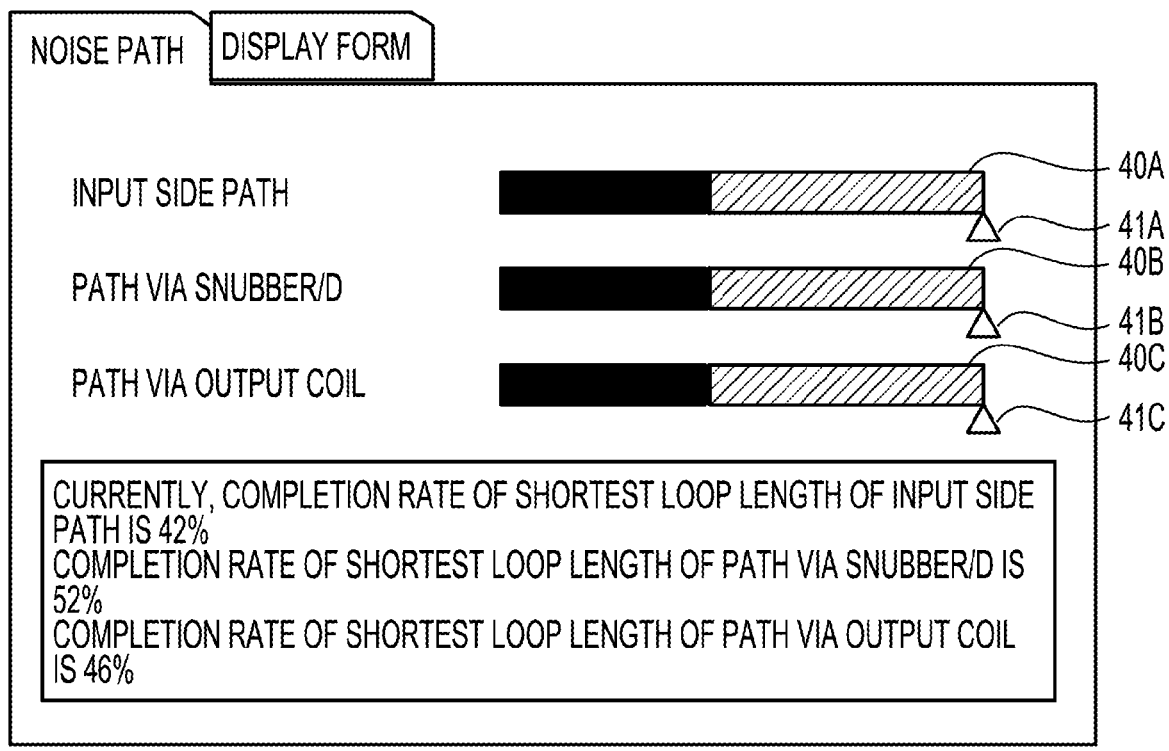
FIG. 8 is a view illustrating an example of a display control panel.

FIG. 8 is a view illustrating an example of the display control panel. FIG. 8 illustrates a display control panel when a "noise path" is being selected out of two tabs of the display control panel, that is, the "noise path" and the "display form". As illustrated in FIG. 8, the display control panel includes a slider bar 40A and a slider 41A for the power supply noise path on the input side, a slider bar 40B and a slider 41B for the power supply noise path (via the snubber/D) on the output side, and a slider bar 40C and a slider 41C for the power supply noise path (via the output coil) on the output side. By designating the positions of the sliders 41A to 41C on the slider bars 40A to 40C, the progression degrees of the power supply noise path on the input side, the power supply noise path (via the snubber/D) on the output side, and the power supply noise path (via the output coil) on the output side may be designated. Furthermore, in the display control panel, the completion rate of the shortest loop length is displayed as 42%, 52%, and 46%, respectively, in the order of the power supply noise path on the input side, the power supply noise path (via the snubber/D) on the output side, and the power supply noise path (via the output coil) on the output side.

Figure 9:
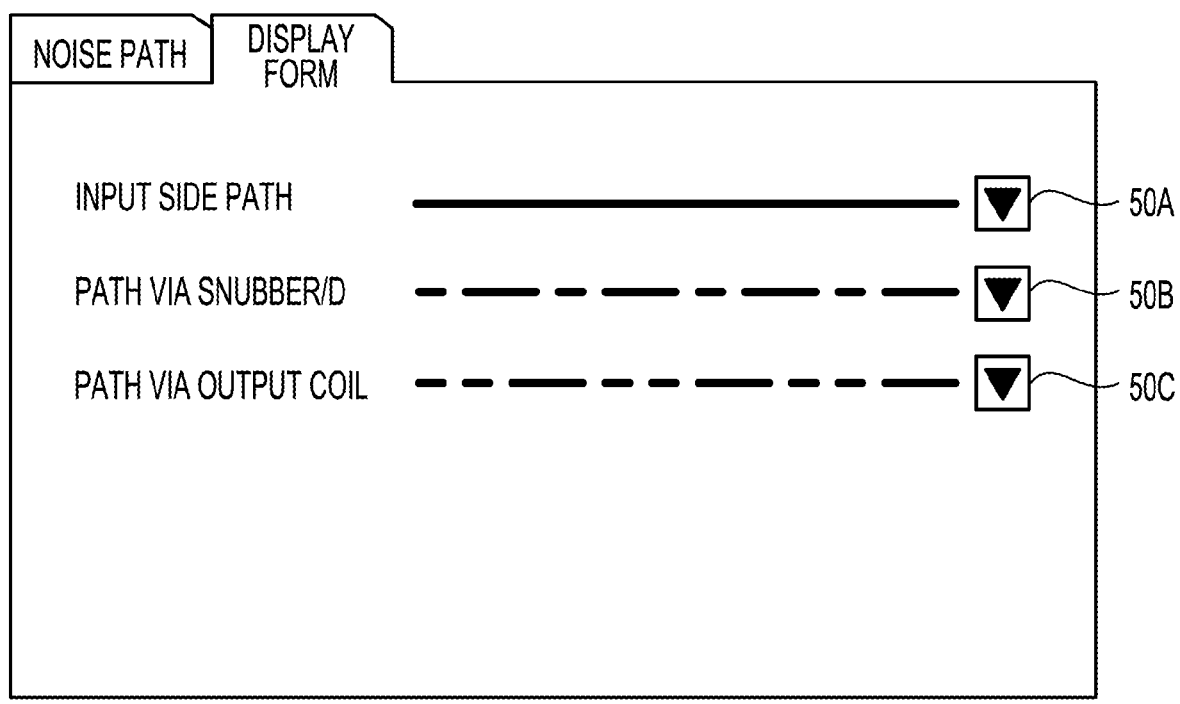
FIG. 9 is a view illustrating an example of a display control panel.

FIG. 9 is a view illustrating an example of the display control panel. FIG. 9 illustrates a display control panel when the "display form" is being selected out of two tabs "noise path" and "display form" of the display control panel. As illustrated in FIG. 9, the display control panel includes pull-down menus 50A to 50C that designate a line type for the power supply noise path on the input side, the power supply noise path (via the snubber/D) on the output side, and the power supply noise path (via the output coil) on the output side, respectively. By designating any line type from the pull-down menus 50A to 50C, the display forms of the power supply noise path on the input side, the power supply noise path (via the snubber/D) on the output side, and the power supply noise path (via the output coil) on the output side may be changed.

The progression degree reception unit 15E is a processing unit that receives a designation of the progression degree.

By way of example only, the progression degree reception unit 15E may receive the above-mentioned progression degree by receiving a designation of the position of the slider 41A, 41B, or 41C on the display control panel illustrated in FIG. 8. In addition, although not illustrated, the progression degree reception unit 15E may receive a command of increasing the progression degree monotonously by receiving an operation of a moving image play button that moves the position of the slider 41A, 41B, or 41C from the beginning to the end of the slider bar 40A, 40B, or 40C with the lapse of time. When the progression degree is designated in this manner, a path from the start point of the power supply noise path to the ratio corresponding to the designated progression degree is displayed on the two-dimensional CAD drawing.

The edition reception unit 15F is a processing unit that receives an edition of dimensions, layouts, and the like of components on the two-dimensional CAD drawing.

For example, the edition reception unit 15F may receive an edition of changing the dimensions of the power supply pattern 21A and the GND pattern 21B on the two-dimensional CAD drawing or changing the layouts of components existing on the power supply noise path such as, for example, the capacitors C1 to C3, the resistors R, the output coil L, vias (not illustrated), and the like. When the two-dimensional CAD drawing is edited in this manner, processes such as generation of a power supply noise path, calculation of a completion rate, display of a power supply noise path, etc. are executed again.

(1) Power Supply Noise Path Display Process

Figure 10:
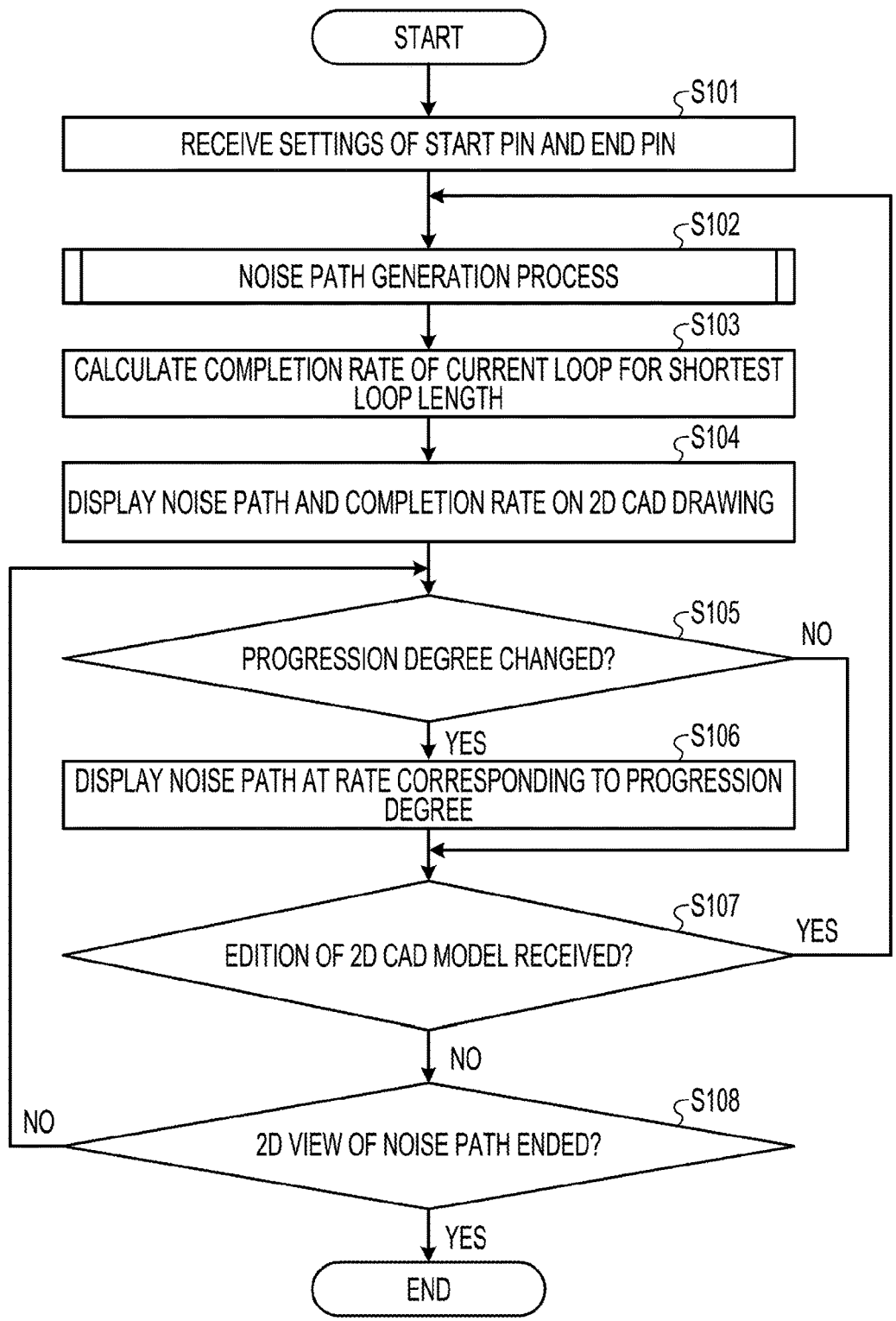
FIG. 10 is a flowchart illustrating the procedure of a power supply noise path display process according to the first embodiment.

FIG. 10 is a flowchart illustrating the procedure of the power supply noise path display process according to the first embodiment. This process is executed when a noise path display request is received while the CAD system is being activated.

As illustrated in FIG. 10, the setting reception unit 15A receives the settings of the start point and the end point of a power supply noise path (operation S101). Subsequently, the path generation unit 15B executes a "path generation process" of generating a power supply noise path based on the start pin and the end pin received in operation S101 (operation S102).

Then, the completion rate calculation unit 15C calculates the completion rate of the shortest loop length by calculating the ratio of the path length of the power supply noise path generated in operation S102 to the path length of the shortest loop assumed to be the shortest (operation S103).

Subsequently, the display controller 15D displays the power supply noise path generated in operation S102 on the two-dimensional CAD drawing and causes the output unit 11B to display the completion rate of the shortest loop length calculated in operation S103 (operation S104).

Thereafter, when it is determined that a change in the progression degree is received through a GUI operation or the like of moving the slider on the slider bar ("Yes" in operation S105), the display controller 15D displays the power supply noise path at a rate corresponding to the progression degree changed in operation S105 on the two-dimensional CAD drawing (operation S106). Meanwhile, when it is determined that the change in the progression degree is not received ("No" in operation S105), operation S106 is skipped.

Further, when it is determined that the two-dimensional CAD drawing is edited ("Yes" in operation S107), operations S102 to S105 are executed again based on the edited two-dimensional CAD drawing. When it is determined that the two-dimensional CAD drawing is not edited ("No" in operation S107), the process proceeds to operation S108.

Thereafter, until the display of the two-dimensional view of the power supply noise is ended ("No" in operation S108), operations S105 to S107 are repeatedly executed. When it is determined that the display of the two-dimensional view of the power supply noise is ended ("Yes" in operation S108), the process is ended.

(2) Power Supply Noise Path Generation Process

Figure 11:
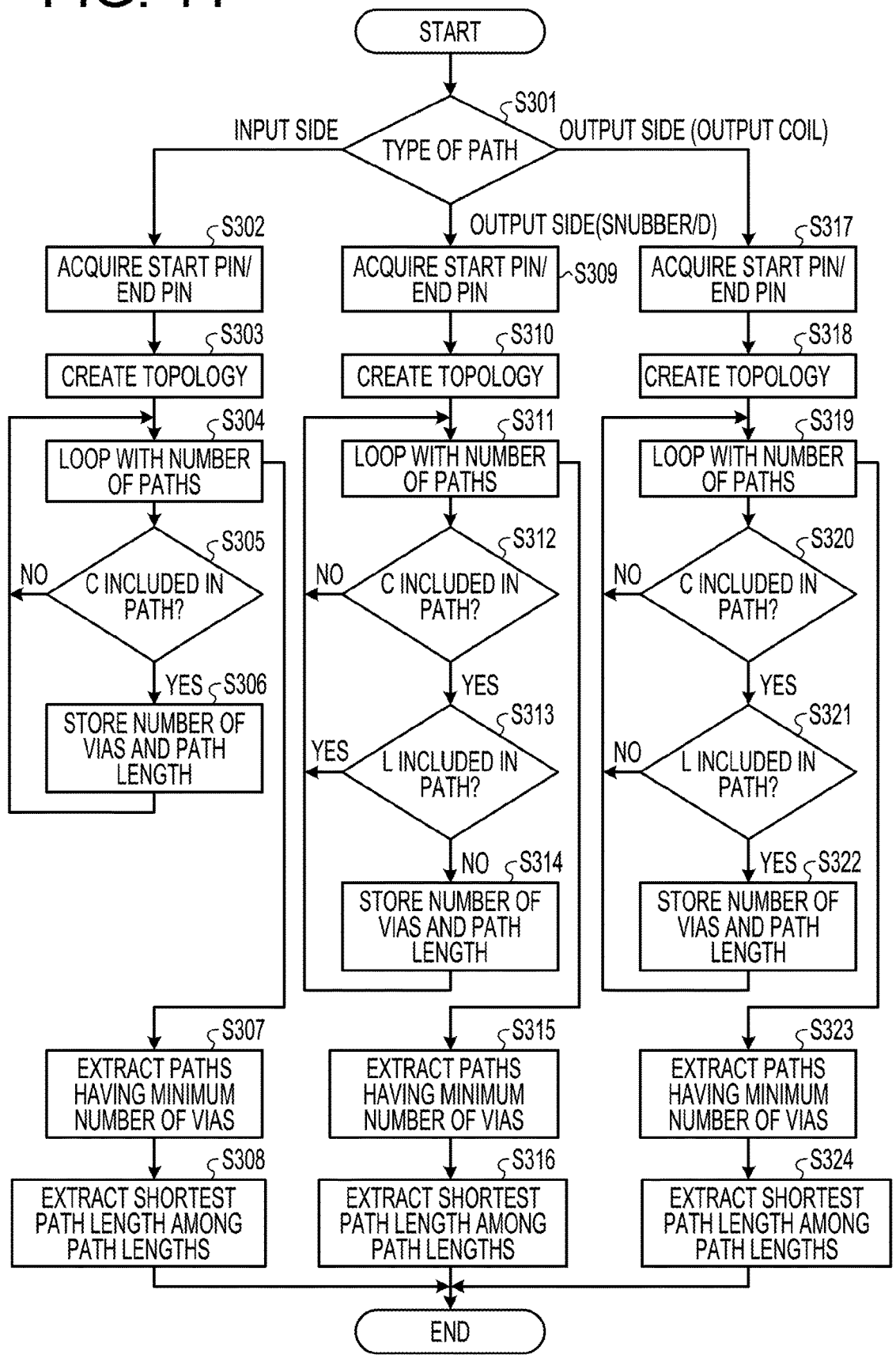
FIG. 11 is a flowchart illustrating the procedure of a power supply noise path generation process according to the first embodiment.

FIG. 11 is a flowchart illustrating the procedure of the power supply noise path generation process according to the first embodiment. This process corresponds to operation S102 illustrated in FIG. 10.

As illustrated in FIG. 11, when the type of the power supply noise path is the input side (the input side in operation S301), the following operations S302 to S308 are executed by the path generation unit 15B.

That is, the path generation unit 15B acquires the settings of the start pin and the end pin set in operation S101 (operation S302). Subsequently, the path generation unit 15B creates a topology of connecting the start pin to the end pin acquired in operation S302 (operation S303).

Thereafter, the path generation unit 15B loops the following operations S305 and S306 with the number of topologies created in operation S303 (operation S304). That is, the path generation unit 15B determines whether the capacitor C1 is included in a topology selected from the topologies created in operation S303 (operation S305). At this time, when it is determined that the capacitor C1 is not included in the topology ("No" in operation S305), the process returns to operation S304. Meanwhile, when it is determined that the capacitor C1 is included in the topology ("Yes" in operation S305), the path generation unit 15B stores the number of vias and the path length of a path formed by the topology in the work area of an internal memory (not illustrated) (operation S306), and the process returns to operation S304.

Then, when the loop of the number of topologies created in operation S303 is ended, the path generation unit 15B extracts paths having the minimum number of vias among the paths stored in the work area (operation S307). Further, the path generation unit 15B extracts a path having the shortest path length among the paths extracted in operation S307 as a power supply noise path (operation S308), and ends the process.

When the type of the power supply noise path is the output side (via the snubber/D) (the output side (via the snubber/D) operation S301), the following operations S309 to S316 are executed by the path generation unit 15B.

That is, the path generation unit 15B acquires the settings of the start pin and the end pin set in operation S101 (operation S309). Subsequently, the path generation unit 15B generates a topology of connecting the start pin to the end pin acquired in operation S309 (operation S310).

Thereafter, the path generation unit 15B loops the following operations S312 and S314 with the number of topologies created in operation S310 (operation S311). That is, the path generation unit 15B determines whether the capacitor C2 is included in a topology selected from the topologies created in operation S310 (operation S312). At this time, when it is determined that the capacitor C2 is not included in the topology ("No" in operation S312), the process returns to operation S311. Meanwhile, when it is determined that the capacitor C2 is included in the topology ("Yes" in operation S312), the path generation unit 15B again determines whether the output coil L is included in the topology (operation S313). At this time, when it is determined that the output coil L is included in the topology ("Yes" in operation S313), the process returns to operation S311. Meanwhile, when it is determined that the output coil L is not included in the topology ("No" in operation S313), the path generation unit 15B stores the number of vias and the path length of a path formed by the topology in the work area of the internal memory (not illustrated) (operation S314), and the process returns to operation S311.

Then, when the loop of the number of topologies created in operation S310 is ended, the path generation unit 15B extracts paths having the minimum number of vias among the paths stored in the work area (operation S315). Further, the path generation unit 15B extracts a path having the shortest path length among the paths extracted in operation S315 as a power supply noise path (operation S316), and ends the process.

When the type of the power supply noise path is the output side (via the output coil) (the output side (via the output coil) in operation S301), the following operations S317 to S324 are executed by the path generation unit 15B.

That is, the path generation unit 15B acquires the settings of the start pin and the end pin set in operation S101 (operation S317). Subsequently, the path generation unit 15B generates a topology of connecting the start pin to the end pin acquired in operation S317 (operation S318).

Thereafter, the path generation unit 15B loops the following operations S320 and S322 with the number of topologies created in operation S318 (operation S319). That is, the path generation unit 15B determines whether the capacitor C3 is included in a topology selected from the topologies created in operation S318 (operation S320). At this time, when it is determined that the capacitor C3 is not included in the topology ("No" in operation S320), the process returns to operation S319. Meanwhile, when it is determined that the capacitor C3 is included in the topology ("Yes" in operation S320), the path generation unit 15B again determines whether the output coil L is included in the topology (operation S321). At this time, when it is determined that the output coil L is not included in the topology ("No" in operation S321), the process returns to operation S319. Meanwhile, when it is determined that the output coil L is included in the topology ("Yes" in operation S321), the path generation unit 15B stores the number of vias and the path length of a path formed by the topology in the work area of the internal memory (not illustrated) (operation S322), and the process returns to operation S319.

Then, when the loop of the number of topologies created in operation S318 is ended, the path generation unit 15B extracts paths having the minimum number of vias among the paths stored in the work area (operation S323). Further, the path generation unit 15B extracts a path having the shortest path length among the paths extracted in operation S323 as a power supply noise path (operation S324), and ends the process.

[One Aspect of Effect]

As described above, when displaying the power supply noise path on the two-dimensional CAD drawing, the information processing apparatus 10 according to the present embodiment receives a designation of the progression degree of the power supply noise from the start point to the end point of the path, and displays a path from the start point of the power supply noise path to the ratio corresponding to the designated progression degree on the two-dimensional CAD drawing. Therefore, the information processing apparatus 10 according to the present embodiment may improve the visibility of the two-dimensional view of the power supply noise path.

Second Embodiment

Although the embodiment of the disclosed apparatus has been described above, the present disclosure may be implemented in various different forms other than the above-described embodiment. Therefore, other embodiments included in the present disclosure will be described below.

[Progression Degree]

In the above-described first embodiment, descriptions have been made on an example in which the progression degree is received using the slider bar and the slider, but a designation of the progression degree may also be received by other methods. For example, the progression degree may be received by numerical input of a percentage, and the increase or decrease of the progression degree of a predetermined value may also be received by operation on an icon corresponding to the increase or decrease of the progression degree.

[Client Server]

In the above-described first embodiment, the CAD program is executed independently. However, the CAD program may be executed on a server apparatus. When the CAD program is executed on the server apparatus, the process illustrated in FIG. 10 or FIG. 11 may be executed by the server apparatus by using a thin client terminal or a zero client terminal as a client and acquiring operation information for the CAD system from the client.

Further, each element of each of the illustrated units may not necessarily be physically configured as illustrated. That is, the specific form of distribution and integration of each unit is not limited to the illustrated form, and all or a part thereof may be functionally or physically distributed/integrated in any unit depending on various loads, usage conditions, etc. For example, the setting reception unit 15A, the path generation unit 15B, the completion rate calculation unit 15C, the display controller 15D, the progression degree reception unit 15E, or the edition reception unit 15F may be configured to be connected as an external device of the information processing apparatus 10 via a network. In addition, a separate apparatus may be configured to include the setting reception unit 15A, the path generation unit 15B, the completion rate calculation unit 15C, the display controller 15D, the progression degree reception unit 15E, or the edition reception unit 15F, and these units may be configured to be networked and cooperated to implement the functions of the above-described information processing apparatus 10.

[Power Supply Noise Path Display Program]

In addition, the various processes described in the above embodiments may be implemented by executing a prepared program on a computer such as a personal computer or a workstation. Therefore, with reference to FIG. 12, descriptions will be made below on an example of a computer that executes a power supply noise path display program having the same function as that of the above embodiments.

Figure 12:
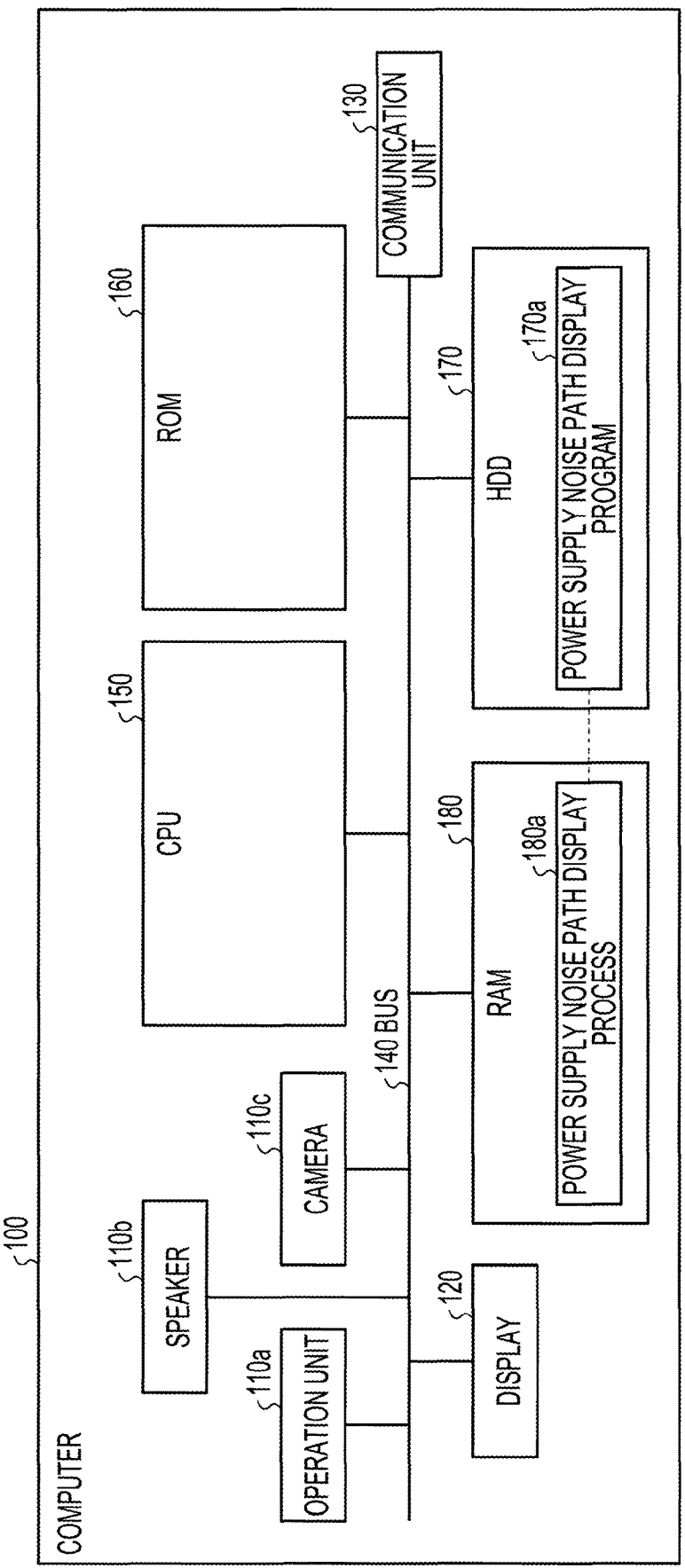
FIG. 12 is a view illustrating an example of a hardware configuration of a computer that executes a power supply noise path display program according to the first embodiment and a second embodiment.

FIG. 12 is a view illustrating an example of a hardware configuration of a computer that executes the power supply noise path display program according to the first embodiment and the second embodiment. As illustrated in FIG. 12, the computer 100 includes an operation unit 110a, a speaker 110b, a camera 110c, a display 120, and a communication unit 130. The computer 100 further includes a CPU 150, a ROM 160, an HDD 170, and a RAM 180. The components 110 to 180 are interconnected via a bus 140.

As illustrated in FIG. 12, the HDD 170 stores a power supply noise path display program 170a that exhibits the same functions as the setting reception unit 15A, the path generation unit 15B, the completion rate calculation unit 15C, the display controller 15D, and the progression degree reception unit 15E described in the first embodiment. The power supply noise path display program 170a may be integrated or separated in the same manner as the setting reception unit 15A, the path generation unit 15B, the completion rate calculation unit 15C, the display controller 15D, and the progression degree reception unit 15E illustrated in FIG. 1. That is, the HDD 170 may not necessarily store all the data described in the first embodiment, but may store data used for processing.

Under such an environment, the CPU 150 reads out the power supply noise path display program 170a from the HDD 170 and deploys the program on the RAM 180. As a result, the power supply noise path display program 170a functions as a power supply noise path display process 180a as illustrated in FIG. 12. The power supply noise path display process 180a deploys various data read from the HDD 170 on an area allocated to the power supply noise path display process 180a among storage areas of the RAM 180, and uses the deployed various data to execute various processes. For example, the process illustrated in FIG. 10 or FIG. 11 is included as an example of the process executed by the power supply noise path display process 180a. Meanwhile, in the CPU 150, all the processing units described in the first embodiment may not necessarily operate, and the processing units corresponding to processes to be executed may be virtually implemented.

In the meantime, the above-described power supply noise path display program 170a may not necessarily be stored in the HDD 170 or the ROM 160 from the beginning. For example, the power supply noise path display program 170a may be stored in a "portable physical medium" inserted into the computer 100, such as a flexible disk, a so-called FD, a CD-ROM, a DVD disk, a magneto-optical disk, or an IC card. Further, the computer 100 may be configured to acquire and execute the power supply noise path display program 170a from the portable physical medium. In addition, the power supply noise path display program 170a may be configured to be stored in another computer or server apparatus connected to the computer 100 via a public line, the Internet, a LAN, a WAN, or the like, and the computer 100 may be configured to acquire and executes the power supply noise path display program 170a from the another computer or server.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
a memory; and
a processor coupled to the memory and configured to:
receive a designation of a progression degree of a power supply noise in which a circuit pattern displayed on a two-dimensional model of a printed circuit board is traced from a start point to an end point of the circuit pattern by a progression of the power supply noise in the circuit pattern;
display, on the two-dimensional model, the circuit pattern from the start point to a point that corresponds to the progression degree of the power supply noise on a three-dimensional model of the printed circuit board based on a setting of the start point and the end point of the circuit pattern; and
display the circuit pattern of the two-dimensional model to distinguish a first pattern to form a part of the circuit pattern and a second pattern to form a part of the circuit pattern, the first pattern and the second pattern having portions overlapping each other.

2. The information processing apparatus according to claim 1, wherein the processor is configured to receive the designation of the progression degree by a designation of a position of a slider on a slider bar.

3. The information processing apparatus according to claim 1, wherein the processor is configured to receive the designation of the progression degree by a command of increasing or decreasing the progression degree monotonously.

4. The information processing apparatus according to claim 1, wherein the processor is further configured to: display a ratio of a length of the first pattern of the printed circuit board with respect to a predetermined length.

5. A non-transitory computer-readable recording medium storing a program that causes a computer to execute a procedure, the procedure comprising:
receiving a designation of a progression degree of a power supply noise in which a circuit pattern displayed on a two-dimensional model of a printed circuit board is traced from a start point to an end point of the circuit pattern by a progression of the power supply noise in the circuit pattern;
displaying, on the two-dimensional model, the circuit pattern from the start point to a point that corresponds to the progression degree of the power supply noise on a three-dimensional model of the printed circuit board based on a setting of the start point and the end point of the circuit pattern; and
displaying the circuit pattern of the two-dimensional model to distinguish a first pattern to form a part of the circuit pattern and a second pattern to form a part of the circuit pattern, the first pattern and the second pattern having portions overlapping each other.

6. The non-transitory computer-readable recording medium according to claim 5, wherein the procedure receives the designation of the progression degree by a designation of a position of a slider on a slider bar.

7. The non-transitory computer-readable recording medium according to claim 5, wherein the procedure receives the designation of the progression degree by a command of increasing or decreasing the progression degree monotonously.

8. The non-transitory computer-readable recording medium according to claim 5, the procedure further comprising: displaying a ratio of a length of the first pattern of the printed circuit board with respect to a predetermined length.

9. A circuit pattern display method comprising:
receiving a designation of a progression degree of a power supply noise in which a circuit pattern displayed on a two-dimensional model of a printed circuit board is traced from a start point to an end point of the circuit pattern by a progression of the power supply noise in the circuit pattern;
displaying, on the two-dimensional model, the circuit pattern from the start point to a point that corresponds to the progression degree of the power supply noise on a three-dimensional model of the printed circuit board based on a setting of the start point and the end point of the circuit pattern; and
displaying the circuit pattern of the two-dimensional model to distinguish a first pattern to form a part of the circuit pattern and a second pattern to form a part of the circuit pattern, the first pattern and the second pattern having portions overlapping each other, by a processor.

10. The circuit pattern display method according to claim 9, wherein the processor receives the designation of the progression degree by a designation of a position of a slider on a slider bar.

11. The circuit pattern display method according to claim 9, wherein the processor receives the designation of the progression degree by a command of increasing or decreasing the progression degree monotonously.

12. The circuit pattern display method according to claim 9, further comprising: displaying a ratio of a length of the first pattern of the printed circuit board with respect to a predetermined length.

* * * * *